(12) United States Patent
Yang et al.

(10) Patent No.: US 9,450,221 B2
(45) Date of Patent: Sep. 20, 2016

(54) SECONDARY BATTERY, COMPONENT FOR THE SAME AND METHOD FOR MANUFACTURING THE SAME

(71) Applicant: LG Chem, Ltd., Seoul (KR)

(72) Inventors: Jung-Hoon Yang, Daejeon (KR); Young-Suk Cho, Daejeon (KR); Seung-Don Choi, Daejeon (KR); Ok-Gyun Kang, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/014,582

(22) Filed: Aug. 30, 2013

(65) Prior Publication Data

US 2014/0011060 A1  Jan. 9, 2014

Related U.S. Application Data

(63) Continuation of application No. PCT/KR2012/011373, filed on Dec. 24, 2012.

(30) Foreign Application Priority Data

Apr. 17, 2012 (KR) .......................... 10-2012-0039999
Dec. 21, 2012 (KR) .......................... 10-2012-0150593

(51) Int. Cl.
*H01M 2/12* (2006.01)
*H01M 2/02* (2006.01)
(Continued)

(52) U.S. Cl.
CPC ............ *H01M 2/12* (2013.01); *H01M 2/021* (2013.01); *H01M 2/0212* (2013.01); *H01M 2/06* (2013.01); *H01M 2/08* (2013.01); *H01M 2/1223* (2013.01); *H01M 2/1235* (2013.01);
(Continued)

(58) Field of Classification Search
CPC .... H01M 2/12; H01M 2/021; H01M 2/0212; H01M 2/06; H01M 2/1235; H01M 10/052; H01M 10/058; Y02E 60/12
USPC ................................................ 429/56–57, 82
See application file for complete search history.

(56) References Cited

U.S. PATENT DOCUMENTS 7,393,610 B2   7/2008   Shimamura et al.
7,718,306 B2   5/2010   Cheon et al.
(Continued)

FOREIGN PATENT DOCUMENTS

JP   2000285904 A   10/2000
JP   2003187776 A   7/2003
(Continued)

*Primary Examiner* — Ula C Ruddock
*Assistant Examiner* — Osei Amponsah
(74) *Attorney, Agent, or Firm* — Lerner, David, Littenberg, Krumholz & Mentlik, LLP

(57) ABSTRACT

A secondary battery includes an electrode assembly having an electrode tab; an electrode lead attached to the electrode tab and having at least one lead hole; a pouch case for accommodating the electrode assembly so that the electrode lead is drawn out; and a sealing tape interposed between the electrode lead and the inner surface of the pouch case and having a venting pattern portion formed at a region corresponding to the lead hole. Therefore, when gas is generated inside a pouch case of a secondary battery due to an abnormal circumstance, for example when an overcurrent flows at the secondary battery since a protective circuit does not operate normally, a sealed state of the pouch case is rapidly released, thereby ensuring the safety of the secondary battery in use.

19 Claims, 8 Drawing Sheets

(51) Int. Cl.
  *H01M 2/06* (2006.01)
  *H01M 2/08* (2006.01)
  *H01M 10/052* (2010.01)
  *H01M 10/058* (2010.01)

(52) U.S. Cl.
  CPC ........ *H01M 10/052* (2013.01); *H01M 10/058* (2013.01); *H01M 2200/00* (2013.01); *H01M 2200/103* (2013.01); *Y10T 29/4911* (2015.01)

(56) References Cited

U.S. PATENT DOCUMENTS 7,935,436 B2    5/2011   Cheon et al.

| | | | |
|---|---|---|---|
| 2006/0238162 A1* | 10/2006 | Cheon | H01M 2/021 320/112 |
| 2007/0292753 A1* | 12/2007 | Zama | H01M 2/0212 429/181 |
| 2010/0266881 A1 | 10/2010 | You et al. | |

FOREIGN PATENT DOCUMENTS

| | | | | |
|---|---|---|---|---|
| JP | 2005-294270 | * | 10/2005 | ............. H01M 2/06 |
| JP | 2009272281 A | | 11/2009 | |
| KR | 100684724 B1 | | 2/2007 | |
| KR | 100968050 B1 | | 7/2010 | |

* cited by examiner

SECONDARY BATTERY, COMPONENT FOR THE SAME AND METHOD FOR MANUFACTURING THE SAME

CROSS-REFERENCE TO RELATED APPLICATION

The present application is a continuation of International Application No. PCT/KR2012/011373 filed on Dec. 24, 2012, which claims priority to Korean Patent Application No. 10-2012-0039999 filed in the Republic of Korea on Apr. 17, 2012 and Korean Patent Application No. 10-2012-0150593 filed in the Republic of Korea on Dec. 21, 2012, the disclosures of which are incorporated herein by reference.

TECHNICAL FIELD

The present disclosure relates to a secondary battery, a component for the same and a method for manufacturing the same, and more particularly, to a secondary battery, which may easily discharge gas generated in a pouch case, a component for the secondary battery and a method for manufacturing the secondary battery.

BACKGROUND ART

With active use of portable electric products such as video cameras, cellular phones, portable PC or the like, secondary batteries mostly used as power sources of such products are becoming much more important.

Unlike a primary battery that is generally not chargeable, a secondary battery is chargeable and dischargeable. Such a secondary battery is being actively studied due to the development of high-tech products such as digital cameras, cellular phones, laptops, power tools, electric bicycles, electric vehicles, hybrid vehicles, large-capacity power storage devices or the like.

In particular, lithium secondary batteries are more actively used since they have high energy density per unit weight and allow rapid charging, in comparison to other kinds of secondary batteries such as lead storage batteries, nickel-cadmium batteries, nickel-hydrogen batteries, nickel-zinc batteries or the like.

A lithium secondary battery has an operating voltage of 3.6 V or above and is used as a power source of portable electronic devices or several lithium secondary batteries are connected in series or in parallel and used for high-power electric vehicles, hybrid vehicles, power tools, electric bicycles, power storages, UPS or the like.

Since a lithium secondary battery has an operating voltage three times higher than that of a nickel-cadmium battery or a nickel-metal hydride battery and also has an excellent energy density per unit weight, the use of lithium secondary batteries is rapidly growing.

A lithium secondary battery may be classified into a lithium ion battery using a liquid electrolyte and a lithium ion polymer battery using a polymer solid electrolyte depending on the kind of electrolyte. In addition, a lithium ion polymer battery may be classified into a solid-phase lithium ion polymer battery containing no electrolyte and a lithium ion polymer battery using a gel-type polymer electrolyte containing an electrolyte, depending on the kind of polymer solid electrolyte.

In most cases, a lithium ion battery using a liquid electrolyte uses a cylindrical or rectangular metal can as a container, which is sealed by welding. Since the can-type secondary battery using such a metal can has a fixed shape, the design of an electric product using such a power source is limited and is difficult to reduce in volume. Therefore, a pouch-type secondary battery where an electrode assembly and an electrolyte are put into a pouch package made of a film and then sealed has been developed and used.

However, since the lithium secondary battery may explode when overheated, it is very important to ensure its safety. The lithium secondary battery may overheat due to various factors. For example, when an overcurrent beyond a limit flows through the lithium secondary battery, the lithium secondary battery may overheat. If an overcurrent flows, the lithium secondary battery generates Joule's heat, which rapidly increases the internal temperature of the battery. In addition, the rapid increase of temperature decomposes the electrolyte, which causes thermal runaway and resultantly leads to explosion of the battery. An overcurrent occurs when a sharp metallic matter pierces the lithium secondary battery, when the insulation between a cathode and an anode is broken due to shrinkage of a separator interposed between the cathode and the anode, or when a rush current is applied to the battery due to abnormality of a charging circuit or load connected to the outside.

Therefore, in order to protect the battery against abnormal circumstances such as an overcurrent, the lithium secondary battery is coupled to a protective circuit. The protective circuit generally includes a fuse element for irreversibly disconnecting a wire through which a charge or discharge current flows, when an overcurrent occurs.

FIG. 1 is a circuit diagram for illustrating arrangements and operating mechanism of a fuse element of a protective circuit coupled to a battery pack including a lithium secondary battery.

As shown in FIG. 1, the protective circuit includes a fuse element 1 for protecting a battery pack when an overcurrent occurs, a sense resistor 2 for sensing an overcurrent, a microcontroller 3 for monitoring the occurrence of an overcurrent and operating the fuse element 1 when an overcurrent occurs, and a switch 4 for switching an operation current to flow to the fuse element 1.

The fuse element 1 is installed at a main line connected to the outermost terminal of the battery pack. The main line is a wire at which a charge current or discharge current flows. FIG. 1 shows that the fuse element 1 is installed at a high-voltage line (Pack+).

The fuse element 1 is a three-terminal element, in which two terminals are connected to the main line at which a charge or discharge current flows and one terminal is connected to the switch 4. In addition, the fuse element 1 includes a fuse 1a serially connected to the main line and fused to be cut at a specific temperature and a resistor 1b which applies heat to the fuse 1a.

The microcontroller 3 monitors whether an overcurrent occurs or not by periodically detecting the voltage at both ends of the sense resistor 2, and when it is determined that an overcurrent occurs, the microcontroller 3 turns on the switch 4. Then, the current flowing through the main line bypasses to the fuse element 1 and is applied to the resistor 1b. Accordingly, Joule's heat generated by the resistor 1b is conducted to the fuse 1a to increase the temperature of the fuse 1a, and when the temperature of the fuse 1a reaches the fusing temperature, the fuse 1a fuses to be cut, thereby irreversibly disconnecting the main line. If the main line is disconnected, an overcurrent does not flow any more, which may solve problems caused by the overcurrent.

However, this technique has many problems. In other words, if the microcontroller 3 malfunctions, the switch 4 may not turn on even when an overcurrent occurs. In this case, a current does not flow to the resistor 1b of the fuse element 1, and therefore the fuse element 1 will not operate. Moreover, a space for disposing the fuse element 1 is separately needed in the protective circuit, and a program algorithm for controlling the operation of the fuse element 1 must be loaded in the microcontroller 3. Therefore, the space efficiency of the protective circuit deteriorates and the load of the microcontroller 3 increases. Accordingly, there is an increasing need for an improved technology to solve the outstanding problems.

DISCLOSURE

Technical Problem

The present disclosure is designed to solve the problems of the prior art, and therefore it is an object of the present disclosure to provide a secondary battery, which may ensure the safety in use by allowing gas generated in a pouch case to easily discharge out when the temperature of the secondary battery increases due to an abnormal circumstance and gas is generated inside the pouch case when the secondary battery is in use.

Technical Solution

In one aspect of the present disclosure, there is provided a secondary battery, which includes an electrode assembly having an electrode tab; an electrode lead attached to the electrode tab and having at least one lead hole; a pouch case for accommodating the electrode assembly so that the electrode lead is drawn out; and a sealing tape interposed between the electrode lead and the inner surface of the pouch case and having a venting pattern portion formed at a region corresponding to the lead hole.

Preferably, the lead holes may be formed to be spaced apart from each other along the width direction of the electrode lead, and the venting pattern portions may be formed to be spaced apart from each other along the longitudinal direction of the sealing tape.

Preferably, the distance between neighboring venting pattern portions may be equal to or smaller than the width of each venting pattern portion.

In an embodiment of the present disclosure, the venting pattern portion may be a notch.

Preferably, the notch may be formed to face the electrode assembly.

Selectively, the notch may have at least one shape selected from the group consisting of a wedge shape, a rounded shape and a rectangular shape.

Preferably, the notch may have a wedge shape.

Preferably, a ratio of the depth to the width of the notch may be equal to or greater than 0.5.

In an embodiment of the present disclosure, the venting pattern portion may be a through hole.

In another embodiment of the present disclosure, some of the venting pattern portions may be through holes and the others may be notches.

Preferably, the through holes and the notches may be spaced apart from each other along the width direction of the sealing tape.

Selectively, the electrode lead may be at least one of a cathode lead and an anode lead.

In the present disclosure, the pouch case may have a sealed area formed at the rims thereof, and the venting pattern portion may be positioned inside the sealed area.

In another aspect of the present disclosure, there is also provided a component for a secondary battery, which includes an electrode lead having at least one lead hole; and a sealing tape covering a part of the electrode lead and having a venting pattern portion formed at a region corresponding to the lead hole.

Preferably, the lead holes may be formed to be spaced apart from each other along the width direction of the electrode hole, and the venting pattern portions may be formed to be spaced apart from each other along the longitudinal direction of the sealing tape.

Preferably, the distance between neighboring venting pattern portions may be equal to or smaller than the width of each venting pattern portion.

In an embodiment of the present disclosure, the venting pattern portion may be a notch.

Preferably, the inner surface of the notch may be formed to face the electrode assembly.

Preferably, the notch may have a wedge shape.

Preferably, a ratio of the depth to the width of the notch may be equal to or greater than 0.5.

In another embodiment of the present disclosure, the venting pattern portion may be a through hole.

In another embodiment of the present disclosure, some of the venting pattern portions may be through holes and the others may be notches.

Preferably, the through holes and the notches may be spaced apart from each other along the width direction of the sealing tape.

In another aspect of the present disclosure, there is also provided a method for manufacturing a secondary battery, which includes (a) penetrating through both surfaces of a sealing tape by punching an electrode lead to which the sealing tape is attached; (b) attaching the electrode lead to an electrode assembly; (c) receiving the electrode assembly in a pouch case so that the electrode lead is drawn out; and (d) sealing a rim of the pouch case.

In the present disclosure, in the step (d), the sealed area may include the penetrated area of the sealing tape.

Advantageous Effects

According to the present disclosure, when gas is generated inside a pouch case of a secondary battery due to an abnormal circumstance, for example when an overcurrent flows at the secondary battery since a protective circuit does not operate normally, a sealed state of the pouch case is rapidly released, thereby ensuring the safety of the secondary battery in use.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which:

FIGS. 3a to 3c are enlarged plane views showing a portion M of FIG. 2a;

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, a secondary battery 10 according to an embodiment of the present disclosure will be described with reference to FIGS. 2 to 4.

Figure 1:
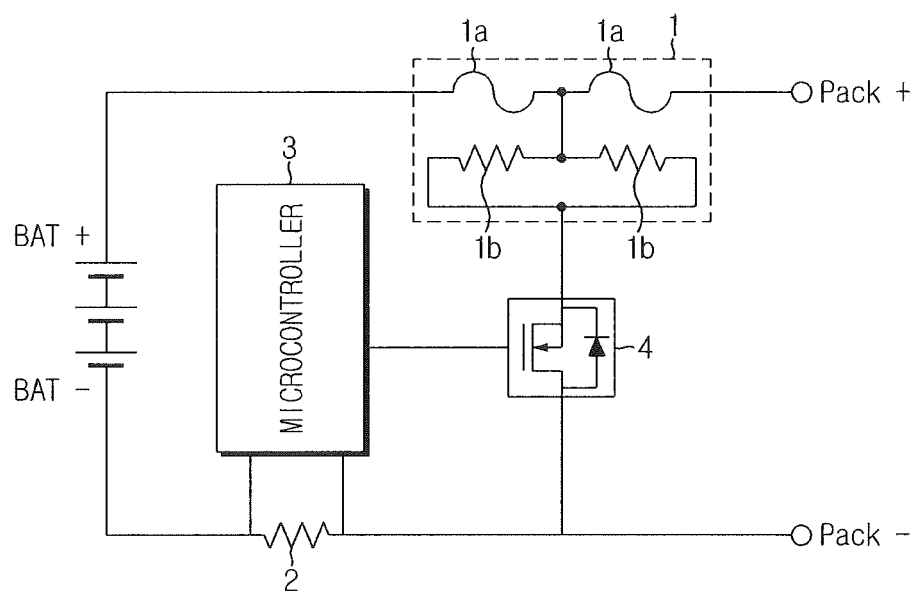
FIG. 1 is a circuit diagram for illustrating arrangements and operating mechanism of a fuse element of a protective circuit coupled to a battery pack including a lithium secondary battery.
Figure 2A:
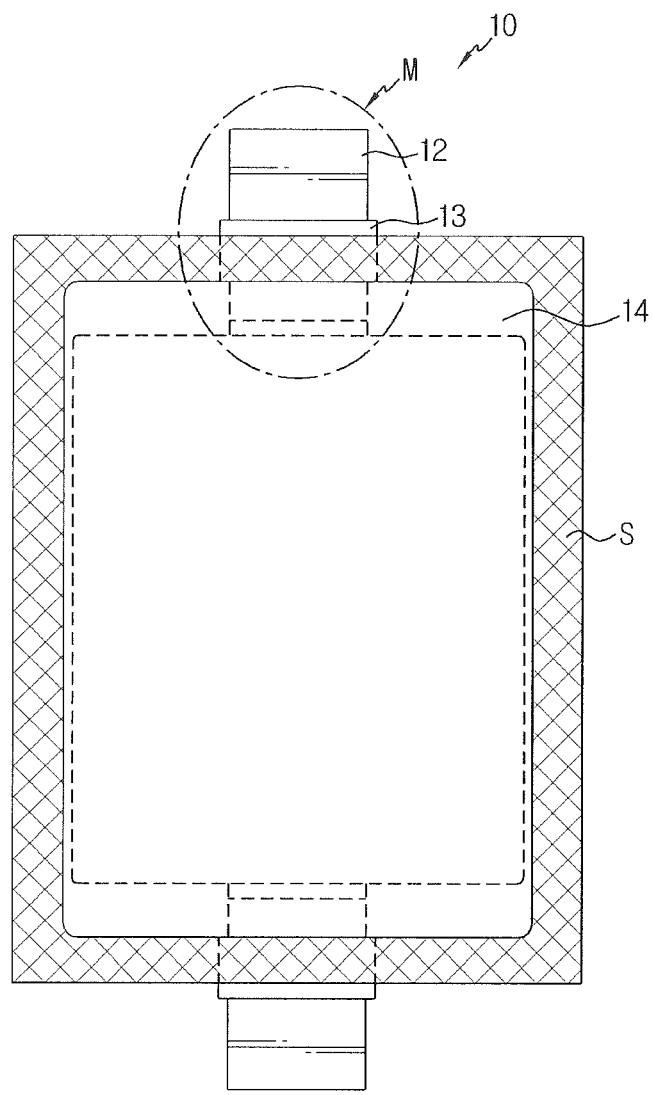
FIGS. 2a and 2b are plane views showing a secondary battery according to an embodiment of the present disclosure.
Figure 2B:
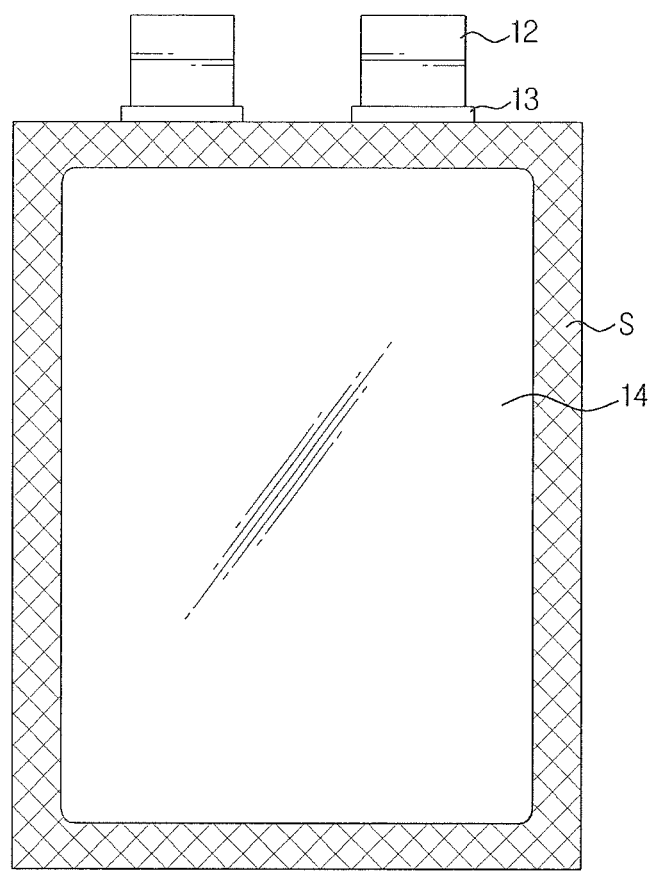
Figure 3A:
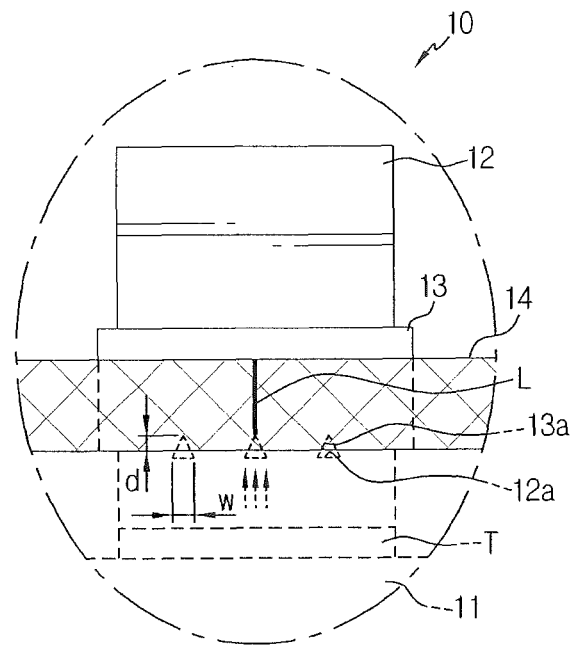
Figure 3B:
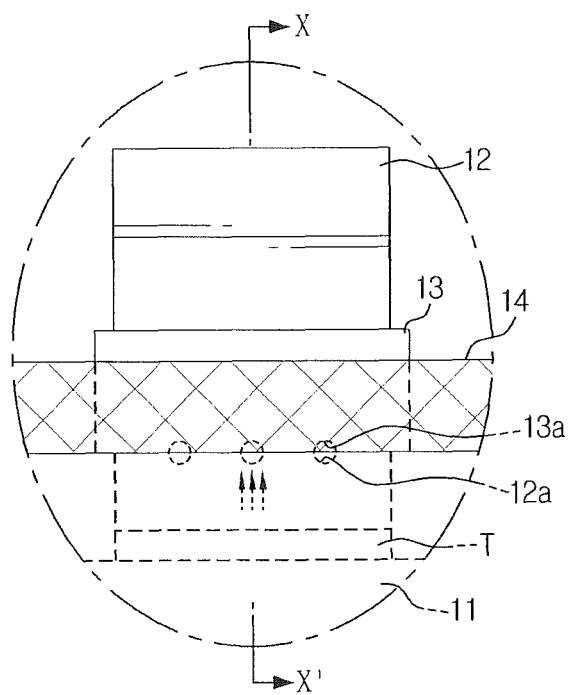
Figure 3C:
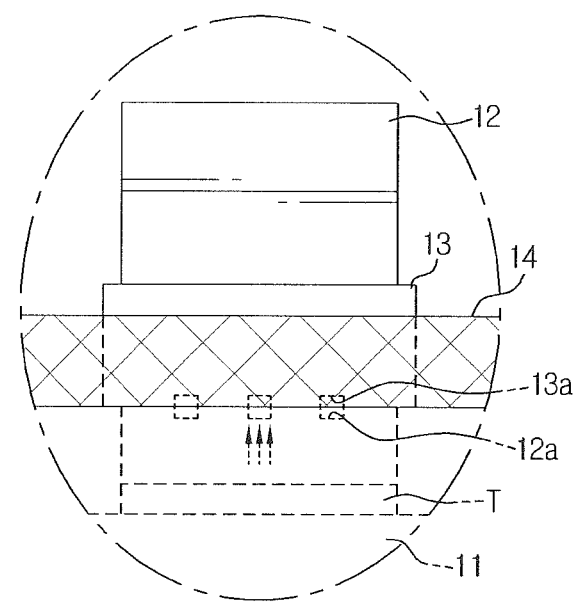
Figure 4:
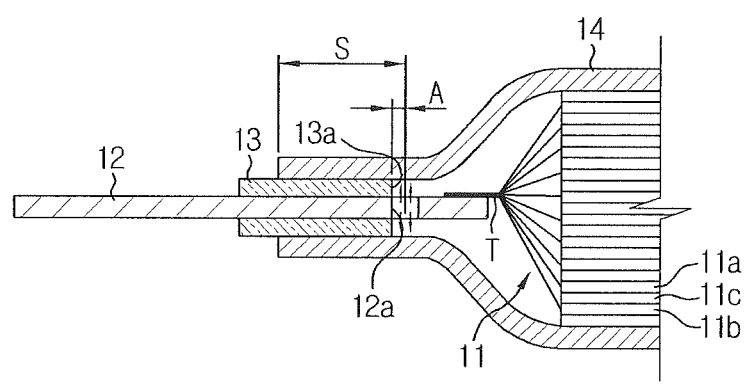
FIG. 4 is a partial cross-sectional view taken along the line X-X' of FIG. 3b.

FIGS. 2a and 2b are plane views showing a secondary battery according to an embodiment of the present disclosure, FIGS. 3a to 3c are enlarged plane views showing a portion M of FIG. 2a, and FIG. 4 is a partial cross-sectional view taken along the line X-X' of FIG. 3b.

Referring to FIGS. 2 to 4, the secondary battery 10 according to an embodiment of the present disclosure includes an electrode assembly 11, an electrode lead 12, a sealing tape 13 and a pouch case 14.

The electrode assembly 11 includes a cathode plate 11a, an anode plate 11b, a separator 11c and an electrode tab T. The electrode assembly 11 may be a stacking-type electrode assembly in which the separator 11c is interposed between the cathode plate 11a and anode plate 11b. Though the electrode assembly 10 is depicted as just a stacking type in the drawings of the present disclosure, the electrode assembly 10 may also be a jelly-roll type electrode assembly.

The cathode plate 11a is formed by applying a cathode active material onto a current collector made of aluminum (Al), and the anode plate 11b is formed by applying an anode active material onto a current collector made of copper (Cu).

The electrode tab T is integrated with the electrode plates 11a, 11b and corresponds to an uncoated portion of the electrode plates 11a, 11b, which is not coated with an electrode active material. In other words, the electrode tab T includes a cathode tab corresponding to a region of the cathode plate 11a which is not coated with a cathode active material and an anode tab corresponding to a region of the anode plate 11b which is not coated with an anode active material.

The electrode lead 12 is made of metal having a thin plate shape and attached to the electrode tab T to extend outwards from the electrode assembly 11. The electrode lead 12 includes a cathode lead attached to the cathode tab and an anode lead attached to the anode tab. The cathode lead and the anode lead may extend in the same direction or in opposite directions depending on the position at which the cathode tab and the anode tab are formed (see FIGS. 2a and 2b). The cathode lead and the anode lead may be made of different materials. That is, the cathode lead is made of aluminum (Al) which is the same as the cathode plate 11a, and the anode lead is made of copper or nickel-coated copper which is the same as the anode plate 11b.

The cathode lead and/or the anode lead have at least one lead hole 12a. When the electrode lead 12 has a plurality of lead holes 12a, the lead holes 12a are spaced apart from each other along the width direction of the electrode lead 12. The lead hole 12a allows the pouch case 14 to be easily unsealed together with a venting pattern portion 13a formed at the sealing tape 13, described later.

The sealing tape 13 is attached to the rim of the electrode lead 12 in the width direction of the electrode lead 12 and interposed between the electrode lead 12 and the inner surface of the pouch case 14. In addition, the sealing tape 13 is made of a film having an insulating property and a heat-bondable property. The sealing tape 13 may include at least one material layer (a single layer or multiple layers) selected from the group consisting of polyimide (PI), polypropylene (PP), polyethylene (PE), polyethylene terephthalate (PET), or the like. The sealing tape 13 prevents a short circuit between the electrode lead 12 and a metal layer of the pouch case 14 and improves the sealing of the pouch case 14.

The sealing tape 13 has at least one venting pattern portion 13a configured to have the size corresponding to the lead hole 12a formed in the electrode lead 12 at a position corresponding thereto. The venting pattern portion 13a corresponds to a notch which is formed with a predetermined depth at the surface of the sealing tape 13 in the thickness direction, which faces the electrode assembly 10. When a plurality of the notches 13a is formed, the notches 13a are spaced apart from each other along the longitudinal direction of the sealing tape 13. If the distance between neighboring notches 13a is smaller than the width w of each notch 13a, a better venting effect may be achieved.

The notch 13a is connected to the lead hole 12a formed at the electrode lead 12 so that pressure concentrates on the inner surface of the notch 13a when gas is generated inside the pouch case 14, which ensures the adhesion between the sealing tape 13 and the pouch case 14 to be easily released. As shown in FIGS. 3a to 3c, the notch 13a may be formed in various shapes such as a wedge shape, a rounded shape, a rectangular shape, or the like.

In particular, if the notch 13a has a wedge shape, when gas is generated inside the pouch case 14, the adhesion between the sealing tape 13 and the pouch case 14 may be more easily released along the line L by means of the pressure concentrated on the edge corner of the notch 13a. When a ratio d/w of depth to the width of the notch 13a having a wedge shape increases, the venting effect of the pouch case 14 becomes more excellent. In order to attain a substantial venting effect, the ratio d/w is preferably equal to or greater than about 0.5.

The pouch case 14 is made of an aluminum pouch film having a thermal-bonding layer formed at the inner surface thereof. The pouch case 14 is sealed by thermally bonding the rims of the pouch case 14 in a state of accommodating the electrode assembly 11 so that the electrode lead is drawn out, and the sealed pouch case 14 is filled with a liquid electrolyte, a solid electrolyte or a gel-typed electrolyte (not shown) depending on the type of a secondary battery 10. At this time, the sealed area S thermally bonded includes a region A where the notch 13a is formed (see FIGS. 3a and 4). Therefore, when gas is generated inside the pouch case 14, pressure concentrated on the notch 13a is applied to the inner surface of the pouch case 14, and so the adhesion between the sealing tape 13 and the pouch case 14 may be more easily released.

Since the secondary battery 20 according to an embodiment of the present disclosure includes the notch, namely the venting pattern portion 13a, formed at the sealing tape 13 and the lead hole 12a formed at a position corresponding to the venting pattern portion 13a as described above, it is possible to ensure excellent safety and easy fabrication simultaneously, as described later.

In other words, in the case a secondary battery has only the venting pattern portion 13a, the secondary battery may be manufactured by attaching a sealing tape to an electrode lead after forming the venting pattern portion 13a at the sealing tape or by forming the venting pattern portion 13a at a sealing tape after attaching the sealing tape to an electrode lead, but none of the above processes can be easily performed.

More particularly, in case of attaching a sealing tape to an electrode lead after forming the venting pattern portion 13a at the sealing tape, it is difficult to attach the venting pattern portion 13a at an accurate position of the electrode lead. On the contrary, if forming the venting pattern portion 13a at a sealing tape after attaching the sealing tape to an electrode lead, it is difficult to form the venting pattern portion 13a due to the strong adhesion between the sealing tape and the electrode lead. Therefore, if a secondary battery 20 has the venting pattern portion 13a and the lead hole 12a together as in the present disclosure, a component for a secondary battery may be easily manufactured by punching or the like. Here, the component for a secondary battery means an electrode lead to which a sealing tape is attached.

In addition, in the case the component for a secondary battery has only the venting pattern portion 13a, the empty space of the venting pattern portion 13a may be clogged up while the sealing tape 13 and the thermal-bonding layer of the pouch case 14 are thermally bonded.

In other words, during the thermal-bonding process, the thermal-bonding layer of the pouch case 14 may melt and fill up the empty space of the venting pattern portion 13a. In this case, an excellent venting effect cannot be expected. However, the lead hole 12a may play a role of preventing this phenomenon.

Next, a secondary battery 20 according to another embodiment of the present disclosure will be described with reference to FIGS. 5 and 6.

Figure 5:
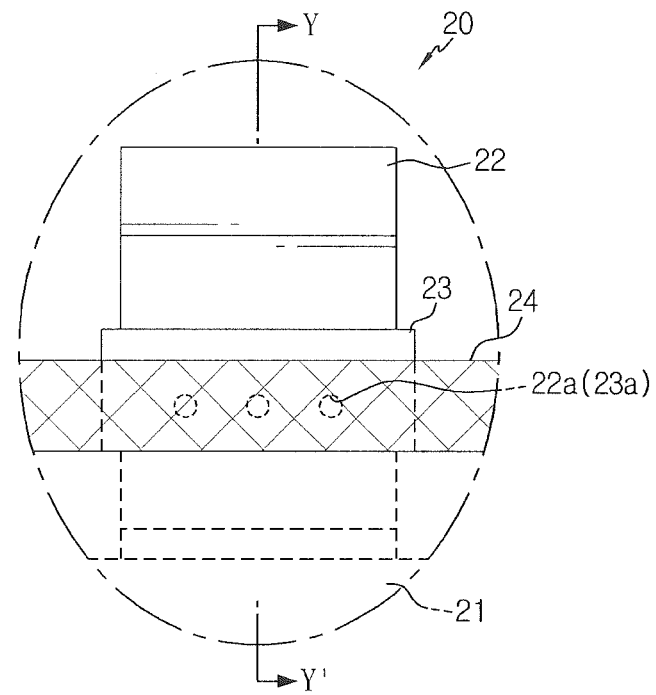
FIG. 5 is a partial plane view showing a secondary battery according to another embodiment of the present disclosure.
Figure 6:
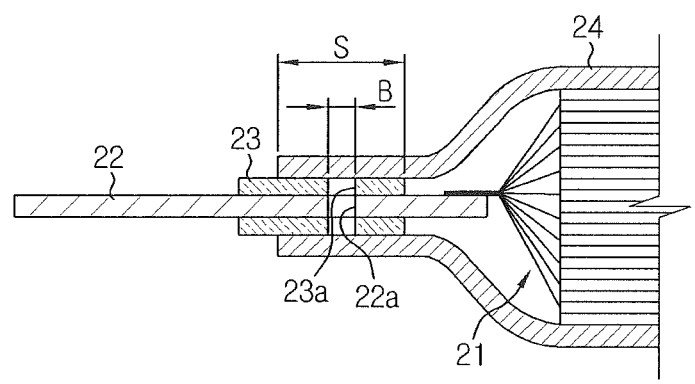
FIG. 6 is a partial cross-sectional view taken along the line Y-Y' of FIG. 5.

FIG. 5 is a partial plane view showing a secondary battery according to another embodiment of the present disclosure, and FIG. 6 is a partial cross-sectional view taken along the line Y-Y' of FIG. 5.

Referring to FIGS. 5 and 6, the secondary battery 20 of this embodiment includes an electrode assembly 21, an electrode lead 22, a sealing tape 23 and a pouch case 24. When compared with the secondary battery 10 of the former embodiment, the secondary battery 20 of this embodiment is substantially identical to the secondary battery 10, except for the structures of the electrode lead 22 and the sealing tape 23. Therefore, when describing the secondary battery 20, only different features will be described in detail and any repetitive details will be omitted.

The electrode lead 22 has at least one lead hole 22a and the sealing tape 23 has a venting pattern portion 23a formed to have a size corresponding to the lead hole 22a at a position corresponding thereto. The venting pattern portion 23a corresponds to a through hole rather than a notch, and may be formed in various shapes such as a rounded wedge shape, a rounded shape, a rectangular shape, or the like. The region B where the through hole 23a is formed is included in the sealed area S of the pouch case 24. Therefore, if gas is generated inside the pouch case 24, pressure is concentrated on a region having weak adhesion by means of the through hole 23a, and so the adhesion between the sealing tape 23 and the pouch case 24 may be easily released.

Next, a secondary battery 30 according to still another embodiment of the present disclosure will be described with reference to FIGS. 7 and 8.

Figure 7:
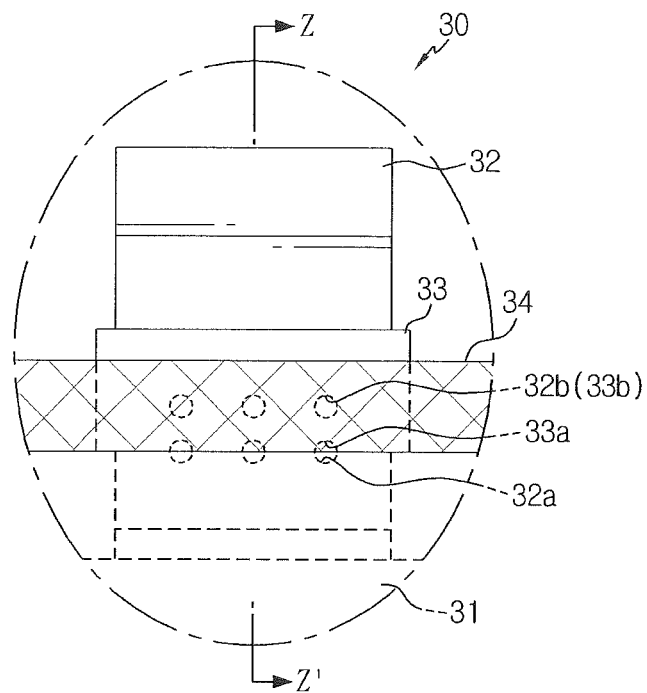
FIG. 7 is a partial plane view showing a secondary battery according to still another embodiment of the present disclosure.
Figure 8:
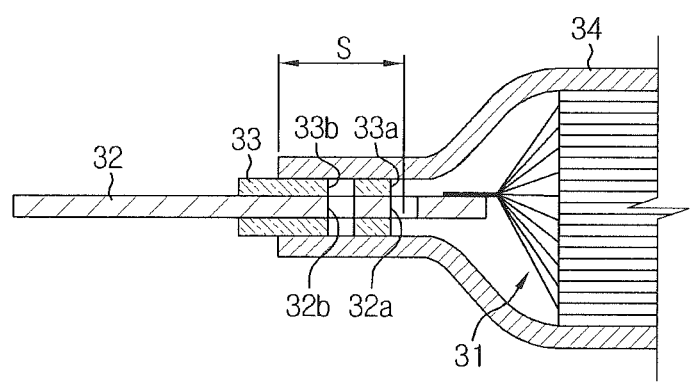
FIG. 8 is a partial cross-sectional view taken along the line Z-Z' of FIG. 7.

FIG. 7 is a partial plane view showing a secondary battery according to still another embodiment of the present disclosure, and FIG. 8 is a partial cross-sectional view taken along the line Z-Z' of FIG. 7.

Referring to FIGS. 7 and 8, the secondary battery 30 of this embodiment includes an electrode assembly 31, an electrode lead 32, a sealing tape 33 and a pouch case 34. When compared with the secondary batteries 10, 20 of the former embodiments, the secondary battery 30 of this embodiment is substantially identical to the secondary batteries 10, 20, of the former embodiments, except for the structures of the electrode lead 32 and the sealing tape 33. Therefore, when describing the secondary battery 30, only different features will be described in detail and any repetitive details will be omitted.

The electrode lead 32 includes at least one first lead hole 32a and one second lead hole 32b, and the sealing tape 33 includes a first venting pattern portion 33a formed to have a size corresponding to the first lead hole 32a at a position corresponding thereto and a second venting pattern portion 33b formed to have a size corresponding to the second lead hole 32b at a position corresponding thereto. The first venting pattern portion 33a and the second venting pattern portion 33b respectively correspond to a notch and a through hole and may be formed in various shapes such as a wedge shape, a rounded shape, a rectangular shape, or the like. The effects obtained by the first lead hole 32a and the notch 33a are identical to those of the secondary battery of the former embodiment, and the effects obtained by the second lead hole 32b and the through hole 33b are identical to those of the secondary battery 20 of the former embodiment. Therefore, such effects will not be described again.

Meanwhile, the first lead holes 32a and the second lead holes 32b are formed side by side along the longitudinal direction of the electrode lead 32, and therefore the notches 33a and the through holes 33b may also be formed side by side along the width direction of the sealing tape 33. In this case, pressure is concentrated by not only the notch 33a but also the through hole 33b, which allows the adhesion between the sealing tape 33 and the pouch case 34 to be more easily released.

Next, a method for manufacturing a secondary battery according to the present disclosure will be described with reference to FIG. 9.

Figure 9:
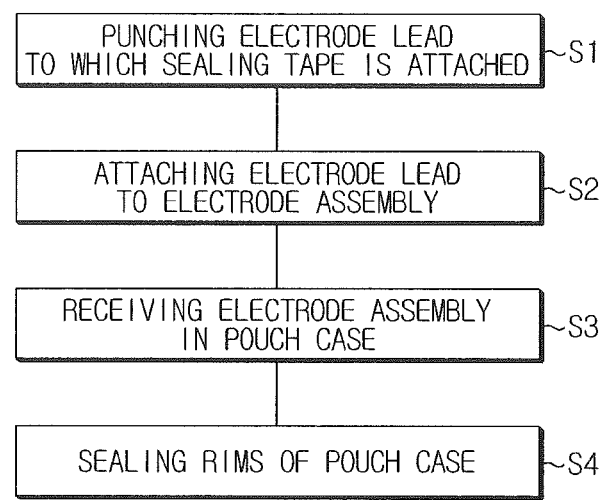
FIG. 9 is a flowchart for illustrating a method for manufacturing a secondary battery according to the present disclosure.

FIG. 9 is a flowchart for illustrating a method for manufacturing a secondary battery according to the present disclosure.

Referring to FIG. 9, the method for manufacturing the secondary battery 10, 20, 30 according to the present disclosure includes (S1) punching an electrode lead 12 to which a sealing tape 13 is attached; (S2) attaching the electrode lead 12 to an electrode assembly 11; (S3) receiving the electrode assembly 11 in a pouch case 14; and (S4) sealing a rim of the pouch case 14.

In Step S1, the electrode lead 12 to which the sealing tape 13 is attached is punched, so that opposite surfaces of the sealing tape 13 are penetrated. In other words, in Step S1, at least one lead hole 12a is formed in the electrode lead 12, and a notch 13a and/or a through hole 23a having a size corresponding to the lead hole 12a are formed in the sealing tape 13 at a position corresponding thereto.

In Step S2, the component for a secondary battery which has been prepared through Step S1 is attached to an electrode tab 11a of an electrode assembly 11.

In Step S3, the electrode assembly 11 is placed in a pouch case 14 so that the electrode lead 12 is drawn out from the pouch case 14.

In Step S4, a rim of the pouch case 14 is sealed so that the sealed area S includes the penetrated regions A, B of the sealing tape.

The secondary battery 10, 20, 30 manufactured by using the method as described above has a structure capable of easily discharging gas from the pouch case when the gas is generated inside the pouch case due to abnormal phenomenon of the secondary battery, thereby ensuring the safety of the secondary battery in use.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A secondary battery, comprising:
    an electrode assembly having an electrode tab;
    an electrode lead attached to the electrode tab and having at least one lead hole defining an internal space;
    a pouch case for accommodating the electrode assembly so that the electrode lead is drawn out; and
    a sealing tape interposed between the electrode lead and the inner surface of the pouch case and having at least one venting pattern portion formed at a region corresponding to the lead hole, wherein the venting pattern portion is a notch, and wherein the notch overlaps with the lead hole, with a boundary of the notch being coterminous with at least a portion of a boundary of the lead hole, such that the boundary of the notch extends along the same path as the portion of the boundary of the lead hole;
    wherein the internal space of the lead hole is empty.

2. The secondary battery according to claim 1,
    wherein the lead holes are formed to be spaced apart from each other along the width direction of the electrode lead, and
    wherein the venting pattern portions are formed to be spaced apart from each other along the longitudinal direction of the sealing tape.

3. The secondary battery according to claim 2, wherein the distance between neighboring venting pattern portions is equal to or smaller than the width of each venting pattern portion.

4. The secondary battery according to claim 1, wherein the notch is formed to face the electrode assembly.

5. The secondary battery according to claim 1, wherein the notch has at least one shape selected from the group consisting of a wedge shape, a rounded shape and a rectangular shape.

6. The secondary battery according to claim 4, wherein the notch has a wedge shape.

7. The secondary battery according to claim 6, wherein a ratio of the depth to the width of the notch is equal to or greater than 0.5.

8. The secondary battery according to claim 1, further comprising a second venting pattern portion, wherein the second venting pattern portion is a through hole.

9. The secondary battery according to claim 8, wherein the through hole and the notch are spaced apart from each other along the width direction of the sealing tape.

10. The secondary battery according to claim 1, wherein the electrode lead is at least one of a cathode lead and an anode lead.

11. The secondary battery according to claim 1,
    wherein the pouch case has a sealed area formed at the rims thereof, and
    wherein the venting pattern portion is positioned inside the sealed area.

12. A component for a secondary battery, comprising: an electrode lead having at least one lead hole defining an internal space; and
    a sealing tape covering a part of the electrode lead and having at least one venting pattern portion formed at a region corresponding to the lead hole, wherein the venting pattern portion is a notch, and wherein the notch overlaps with the lead hole, with a boundary of the notch being coterminous with at least a portion of a boundary of the lead hole, such that the boundary of the notch extends along the same path as the portion of the boundary of the lead hole;
    wherein the internal space of the lead hole is empty.

13. The component for a secondary battery according to claim 12,
    wherein the lead holes are formed to be spaced apart from each other along the width direction of the electrode hole, and
    wherein the venting pattern portions are formed to be spaced apart from each other along the longitudinal direction of the sealing tape.

14. The component for a secondary battery according to claim 13, wherein the distance between neighboring venting pattern portions is equal to or smaller than the width of each venting pattern portion.

15. The component for a secondary battery according to claim 12, wherein the inner surface of the notch is formed to face the electrode assembly.

16. The component for a secondary battery according to claim 12, wherein the notch has a wedge shape.

17. The component for a secondary battery according to claim 12, wherein a ratio of the depth to the width of the notch is equal to or greater than 0.5.

18. The component for a secondary battery according to claim 12, further comprising a second venting pattern portion, wherein the second pattern portion is a through hole.

19. The component for a secondary battery according to claim 18, wherein the through hole and the notch are spaced apart from each other along the width direction of the sealing tape.

* * * * *